United States Patent Office 3,518,249
Patented June 30, 1970

3,518,249
OLIGOSACCHARIDE PROPIONATE COMPOSITIONS AND PROCESSES
Gordon D. Hiatt, Martin E. Rowley, and Walter D. Slowig, Rochester, N.Y., assignors to Eastman Kodak Company, Rochester, N.Y., a corporation of New Jersey
No Drawing. Filed Dec. 1, 1966, Ser. No. 598,176
Int. Cl. C08b 3/08, 21/02, 29/10
U.S. Cl. 260—227    2 Claims

ABSTRACT OF THE DISCLOSURE

Oligosaccharide propionates having an average degree of polymerization of from about 4 to about 20 and containing up to about 10 percent hydroxyl are useful as plasticizers and as control agents for manufacture of foamed plastics. The oligosaccharide propionates can be prepared by degrading a cellulose propionate in the presence of an acid catalyst.

This invention relates to low viscosity cellulose esters and their incorporation as additives in plastic materials. More particularly, this invention refers to cellulose propionates of an extremely low degree of polymerization (i.e., those having an average degree of polymerization of from about 4 to about 20, conveniently called "oligosaccharide propionates"), which have utility as plasticizers and foam controllers.

Little interest has been shown in cellulose esters of an extremely low degree of polymerization. Indeed, it has been an object of the art to provide methods of preventing the degradation of cellulose esters into low-viscosity oligosaccharide esters.

We have found that both oligosaccharide triesters (fully esterified oligosaccharide units) and partially hydrolyzed oligosaccharide esters (partially esterified oligosaccharide units) may be used as plasticizers in commercial plastic materials. When so used, they provide improved flow of the plastic and have superior ability to remain in the plastic even when exposed to moisture or prolonged high temperature.

We have also found that oligosaccharide esters provide a means of control over the foam structure of polymeric foam products, such as polyurethane foams. When foamed plastics are made, it is important that the desired foam structure exists as the plastic sets. For example, polyurethane plastics, which are the reaction products of organic polyisocyanates and polyhydroxyl compounds, may be foamed by the addition of water and catalyst to generate $CO_2$ gas; or, inert gas may be introduced in the prepolymer system from without. If the prepolymer solution is not sufficiently viscous, the entrapped gas will escape and the foam will collapse before the plastic solidifies. If the viscosity of the prepolymer solution is too high, the addition and thorough mixing of additives into the prepolymer solution is difficult and the plastic may set before an adequate foam structure is established. With the addition of oligosaccharide esters the viscosity of the prepolymer mix can be controlled prior to foaming. When the viscosity of the prepolymer solution is increased by the addition of from about 0.5 to about 5 weight percent of the oligosaccharide ester (based on the weight of the reaction products), the bulk density of the foam becomes less because more of the gas is retained. A more uniform cellular structure results, showing less tendency to shrink or collapse when cured.

In the following examples, all "parts" are by weight unless otherwise specified.

PREPARATION OF OLIGOSACCHARIDE TRIPROPIONATE

The oligosaccharide tripropionate was prepared by degrading cellulose tripropionate in the presence of methanesulfonic acid or perchloric acid catalyst. The following examples will serve to enable one skilled in the art to manufacture and isolate oligosaccharide triesters of low intrinsic viscosity.

Example 1

The starting material consisted of cellulose tripropionate. Its analysis was as follows:

| | |
|---|---|
| Inherent viscosity $\{\eta\}$ (acetone) | 0.76 |
| Perecnt OH | 0.04 |
| Percent total sulfur | 0.0023 |
| Melting point (M.P.) ° C. | 239 |
| Char point (C.P.) ° C. | 260 |

METHANESULFONIC ACID DEGRADATION 200 parts of cellulose tripropionate were dissolved in 90 parts of propionic anhydride and 360 parts of propionic acid at 80° C. The catalyst, consisting of 24 parts methanesulfonic acid in 50 parts of propionic acid was slowly added to the solution. The solution was stirred rapidly for approximately 15 minutes and was held in the 80° C. bath for 23 hours without further agitation, then the product was precipitated and washed in distilled water. Prior to the final wash, a 5% sodium bicarbonate solution was slowly added to the product until the slurry became neutral. The product was given a final wash with distilled water and dried in a 50° C. The product had the following properties:

| | |
|---|---|
| $\{\eta\}$ at 0.25 g./100 cc. acetone | 0.02 |
| M.P. ° C. | 80–85 |
| C.P. ° C. | 270 |
| Percent total sulfur | 0.001 |

PERCHLORIC ACID DEGRADATION

A conventional glass-lined reactor heated to 80° C. was charged with 1800 parts of propionic anhydride and 7200 parts of prionic acid, to which were added 4000 parts of cellulose triproprionate starting material. Upon complete solution of the tripropionate, the catalyst, consisting of 5 parts of perchloric acid in 1000 parts of propionic acid, was added slowly with stirring. After 23 hours, the product had the following properties:

| | |
|---|---|
| $\{\eta\}$ at 0.25 g./100 cc. acetone | 0.03 |
| M.P. ° C. | 53–65 |
| C.P. ° C. | 295 |
| Percent total sulfur | 0.003 |

Hydrolyzed oligosacchoride propionates were prepared in the following manner from the oligosaccharide tripropionates.

Example 2

Three thousand parts of fully esterified oligosaccharide propionate were dissolved in 5100 parts of propionic acid at 65° C. To this was added, with agitation, a catalyst consisting of 24 parts of 95% sulfuric acid in 525 parts of water and 450 parts of propionic acid. The mixture remained in the 65° C. bath for 3½ hours without agitation and was then precipitated in distilled water. It was washed throughly with distilled water, neutralized prior to the final wash with sodium carbonate, and dried under vacuum. The product analyzed as follows:

| | |
|---|---|
| $\{\eta\}$ acetone (0.25%) | 0.01 |
| M.P. ° C. | 94.0 |
| C.P. ° C. | 288.0 |
| Percent total sulfur | 0.013 |
| Percent OH | 1.12 |

Other suitable methods may be employed to prepare hydrolyzed oligosaccharide propionate, such as, for instance, perchloric acid catalyzed hydrolysis. Also, a greater degree of hydrolysis may be obtained by allowing the hydrolysis reaction to proceed for a longer period of time. Products having as much as 10% of hydroxyl have been found to have the valuable utility set forth above. However, preferred products are those having at most about 3.5% hydroxyl.

Because polymers are composed of mixtures of molecules with different degrees of polymerization, it is necessary to isolate groups of molecules over which variations in properties are small before an accurate definition of the polymer may be made. In order to more precisely define the oligosaccharides produced, 15 parts of oligosaccharide tripropionate of intermediate inherent viscosity (0.11 in acetone) were fractionated into small fractions, each more homogeneous than the original material. Fractional precipitation was carried out from a solution of the oligosaccharide in 1000 parts of acetone, with precipitation by means of an acetone-water solution (50:50 by volume) containing 2% sodium chloride.

As can be seen from Table I, the fifth fraction produced an oily liquid of a very low molecular weight. Analysis of this oily fraction yielded a molecular weight of 860, indicating an oligosaccharide tripropionate of 2 anhydroglucose units. The solid fractions (1–4), therefore, were all greater than 2 anhydroglucose units in length, and were probably within the range of 6 to 20 units.

TABLE I.—FRACTIONATION OF CELLULOSE TRIPROPIONATE
Inherent viscosity (acetone) : 0.11
Sample weight: 15 grams

| Fraction | Weight of fraction (grams) | Melting point, (° C.) | Inherent viscosity (acetone) |
|---|---|---|---|
| 1 | 4 | 175-207 | 0.19 |
| 2 | 2.5 | 169-187 | 0.12 |
| 3 | 3.5 | 150-171 | 0.07 |
| 4 | 2.5 | 93-106 | 0.04 |
| 5 | Oily liquid | | |

Fractional precipitation of a hydrolyzed oligosaccharide propionate of inherent viscosity (acetone) of 0.13 and OH content of 1.81% also indicated a polymer chain length from about 6 to 20 anhydroglucose units.

TABLE II.—FRACTIONAL PRECIPITATION OF HYDROLYZED OLIGOSACCHARIDE PROPIONATE

| Fraction No. | Weight (grams) | Inherent viscosity (acetone) | Percent OH |
|---|---|---|---|
| 1 | 3.0 | 0.27 | 1.03 |
| 2 | 5.5 | 0.18 | 1.10 |
| 3 | 3.5 | 0.14 | 1.91 |
| 4 | 4.0 | 0.09 | 2.06 |
| 5 | 3.0 | 0.06 | 2.38 |
| 6 | 0.3 | 0.05 | |
| 7 | Oily Liquid | | |

The unusually low degree of polymerization (DP) of the oligosaccharide tripropionate material was also confirmed by calculating the DP from molecular weight determinations (measured in benzene) of 2 low viscosity samples. An oligosaccharide tripropionate with $\{\eta\}=.05$ (M.P. 120–125° C.) yielded an average DP of about 8, and one with $\{\eta\}=0.02$ (M.P. 80–85° C.) had an average DP of about 4.

Thus, the oligosaccharide propionates of the present invention can contain an average of from about 4 to about 20 anhydroglucose units per molecule, but preferably contain an average of from about 4 to about 15 units per molecule.

OLIGOSACCHARIDE PROPIONATES AND TRIPROPIONATES AS PLASTICIZERS

The oligosaccharides were stabilized before being used as plasticizers in commercial plastic. Stabilization of the oligosaccharides was carried out in the following manner.

4 parts of potassium acid oxalate dissolved in 250 parts water was added to 3000 parts of the dry oligosaccharide propionate with constant stirring. The ester was cooled with Dry Ice and a cold solution of 3 parts p-t-butylphenol and 1 part of strontium naphthenate (SN) in 30 parts isopropanol were stirred in. The ester was dried overnight under vacuum.

Five 20,000 pound samples of commercial cellulose acetate butyrate were stabilized by adding to each sample the following:

2 pounds SN stabilizer, 100 pounds p-t-butylphenol — Dissolved in 1000 pounds isopropanol.
2.4 pounds potassium acid oxalate — Dissolved in 500 pounds water.

To each of four of the five stabilized samples above was added a quantity of plasticizer as listed in the following Table III:

TABLE III

| 200 parts samples of stabilized cellulose acetate butyrate | Plasticizer | Amount (parts) | Method of addition |
|---|---|---|---|
| A-1 | Oligosaccharide tripropionate (stabilized)[1] | 40 | Added as a dry powder and tumbled overnight. |
| A-2 | Partially hydrolyzed oligosaccharide propionate (stabilized)[2] | 40 | Do. |
| B | Sucrose acetate isobutyrate (SAIB) | 40 | Dissolved in 50 parts isopropanol and stirred into the cellulose acetate butyrate. |
| C | Dibutyl sebacate | 40 | Do. |
| D | None | | |

[1] $(\eta)$ Acetone, 0.04; M.P., 86° C.; C.P., 295° C.; percent total sulfur, 0.003.
[2] $(\eta)$ Acetone, 0.01; M.P., 94° C.; C.P., 288° C.; percent total sulfur, 0.013; percent OH, 1.12.

The plasticized mixtures were dried at 50° C. for 15 hours and then compounded on 170° C. rolls.

Sheets of each sample were prepared of equal thickness by employing 30 mil shims at the corners of the stainless steel pressing plates. These sheets were used to determine plasticizer permanence under conditions of prolonged dry heat and water submersion.

TABLE IV.—PLASTICIZER RETENTION IN MOLDED SHEETS

| Sample | Percent Lost at 248°F After | | |
|---|---|---|---|
| | 6 days | 13 days | 20 days |
| A-1 | 0.7 | 0.72 | 1.7 |
| A-2 | 0.62 | 0.76 | 1.7 |
| B | 2.1 | 2.5 | 3.2 |
| C | 70.4 | 75.1 | 78.0 |
| D | | | |

TABLE V

Water leaching of plasticizers in molded sheets

| Sample: | Percent plasticizer lost after 2 days in 80° C. water |
|---|---|
| A-1 | 0.17 |
| A-2 | 0.24 |
| B | 0.75 |
| C | 2.74 |
| D | No loss |

Besides having good permanence in the molded plastic sheets, the oligosaccharides improved the flow properties of the cellulose acetate butyrate material. Samples were pressed between two stainless steel plates for 3 minutes at 177° C. under 500 pounds of pressure, with the following results:

TABLE VI.—FLOW COMPARISONS

| Plasticizer added to 100 parts cellulose acetate butyrate | Dimensions of "Pancake" formed | |
|---|---|---|
| | Diameter (inches) | Thickness (mils) |
| 5 parts oligosaccharide tripropionate | 5.8 | 37–42 |
| 20 parts oligosaccharide tripropionate | 6.8 | 29–31 |
| 5 parts hydrolyzed oligosaccharide propionate | 5.8 | 37–44 |
| 20 parts hydrolyzed oligosaccharide propionate | 6.5 | 30–34 |
| 5 parts sucrose acetate isobutyrate | 6.1 | 31–39 |
| 20 parts sucrose acetate isobutyrate | 7.2 | 21–31 |
| 5 parts dibutyl sebacate | 6.7 | 25–35 |
| 20 parts dibutyl sebacate | 9.5 | 13–17 |
| No plasticizer | 5.3 | 44–48 |

OLIGOSACCHARIDE PROPIONATES AS FOAM ADDITIVES

Polyurethane foams were prepared by combining a polyhydroxy compound and tolylene-2,4-diisocyanate at various ratios and reaction conditions. The polyhydroxy alcohols included such compounds as diethylene and triethylene glycols, castor oil and the Carbowaxes 400, 600, 1500 and 4000. It was observed that good foams were prepared by first obtaining a correct viscosity in the prepolymer stage. To obtain this desired viscosity, partially hydrolyzed oligosaccharide propionates were added which varied in inherent viscosity from 0.01 to 1.0 and in hydroxyl content from 0.8% to 8.0%. The oligosaccharide propionates were dissolved in the polyhydroxy constituent or the diisocyanate in case of insolubility in the polyalcohol. With the prepolymer at the desired viscosity, foaming was accomplished by rapidly stirring in water and catalyst, thereby producing $CO_2$ gas. Several examples are as follows.

EXAMPLE 3

Two parts of an oligosaccharide propionate (I.V. acetone 0.12, OH 3.07%, M.P. 167° C.) were dissolved in 18 parts of Carbowax "400" with heating. Upon cooling, 20 parts of tolylene-2,4-diisocyanate were added, resulting in an exothermic reaction. The reaction proceeded without external heating and could be foamed in approximately one hour. When the reaction was essentially complete and the mixture had cooled, a catalyst of 0.3 part triethyl amine in 2 parts of water was added with rapid stirring. The resultant foam was quite tough, had an even cellular structure, and showed a minimum of shrinkage on aging.

When this reaction was carried out without the addition of the oligosaccharide propionate, it was necessary to heat the mixture for several hours at 120° C. before sufficient foam viscosity was produced. The correct reaction mixture viscosity was extremely difficult to achieve or reproduce since it had to be cooled in a brine bath before the addition of water and catalyst due to an extremely exothermic reaction. At best, the resulting foams were of high density and shrank upon standing over a period of several days.

EXAMPLE 4

To 14 parts of tolylene-2,4-diisocyanate were added 2 parts of oligosaccharide propionate (I.V. acetone 0.02, OH 2.3%, M.P. 104° C.) with heating. Eighteen parts of castor oil were next added and the mixture placed in a 120° C. oven for one hour. Upon cooling 3 parts of tolylene-2,4-diisocyanate were added followed by 0.5 part of triethyl amine in 2 parts water, with stirring.

With the addition of the oligosaccharide to the castor oil base foam, the amount of foam shrinkage was lessened and foam rigidity increased.

EXAMPLE 5

Three parts of an oligosaccharide propionate (I.V. 0.02, OH 2.3%, M.P. 104° C.) were dissolved in 12 parts triethylene glycol with heating. The solution was cooled in a brine bath and 20 parts of tolylene-2,4-diisocyanate were added with stirring. When sufficient viscosity had been attained, a catalyst of 0.4 part triethyl amine in 2 parts water was rapidly added. The resultant foam was a very large, even celled foam which did not shrink. Foams without the oligosaccharide additive became limp and shrank into a tacky mass upon standing for several days.

What is claimed is:
1. An oligosaccharide propionate having an average degree of polymerization of from about 4 to about 20, and containing at most about 10% hydroxyl.
2. An oligosaccharide propionate having an average degree of polymerization between about 4 to about 15 and containing from 0–3.5% hydroxyl.

References Cited

UNITED STATES PATENTS

| 3,057,743 | 10/1962 | Touey et al. | 106—169 |
| 3,030,356 | 4/1962 | Touey et al. | 260—234 |
| 2,931,802 | 4/1960 | Touey et al. | 260—234 |
| 3,386,932 | 6/1968 | Steinmann | 260—230 |

DONALD E. CZAJA, Primary Examiner

R. W. GRIFFIN, Assistant Examiner

U.S. Cl. X.R.

106—169; 260—2.5, 13, 22, 230